United States Patent
Chen (10) Patent No.: US 9,201,928 B2
(45) Date of Patent: Dec. 1, 2015

(54) ASSESSING QUALITY OF REVIEWS BASED ON ONLINE REVIEWER GENERATED CONTENT

(71) Applicant: Google Inc., Mountain View, CA (US)

(72) Inventor: Jack Chen, Princeton, NJ (US)

(73) Assignee: Google Inc., Mountain View, CA (US)

( * ) Notice: Subject to any disclaimer, the term of this patent is extended or adjusted under 35 U.S.C. 154(b) by 256 days.

(21) Appl. No.: 13/906,413

(22) Filed: May 31, 2013

(65) Prior Publication Data
US 2015/0178279 A1    Jun. 25, 2015

(51) Int. Cl.
*G06F 17/30*    (2006.01)

(52) U.S. Cl.
CPC .................................. *G06F 17/3053* (2013.01)

(58) Field of Classification Search
CPC combination set(s) only.
See application file for complete search history.

(56) References Cited

U.S. PATENT DOCUMENTS

| | | | |
|---|---|---|---|
| 8,402,036 B2 | 3/2013 | Blair-Goldensohn et al. | |
| 8,423,551 B1 | 4/2013 | Ben-Artzi et al. | |
| 2009/0063408 A1* | 3/2009 | Bao et al. | 707/3 |
| 2009/0193328 A1 | 7/2009 | Reis et al. | |
| 2011/0040787 A1* | 2/2011 | Cierniak et al. | 707/770 |
| 2011/0320373 A1* | 12/2011 | Lee et al. | 705/319 |
| 2013/0091117 A1 | 4/2013 | Minh | |

\* cited by examiner

*Primary Examiner* — Etienne Leroux
(74) *Attorney, Agent, or Firm* — Dority & Manning, P.A.

(57) ABSTRACT

Systems and methods for assessing the quality of a review submitted to a review platform are provided. Reviewers that submit reviews may desire for their reviews to be more prominent or to be assigned greater weight by users of the review platform. According to aspects of the present disclosure, reviewers can optionally enrich reviews posted to an online review platform by associating a quality score with the reviews. The quality score for the review can be determined based on the reviewer's commentary regarding a product or service in a social media setting or in other settings. Reviews posted in an online platform can be prioritized based on the quality score such that reviews consistent with other reviewer generated content are more prominent. Indicia indicative of the quality score can be displayed in conjunction with the reviews such that reviews that are consistent reviews are more readily discernible.

18 Claims, 6 Drawing Sheets

ASSESSING QUALITY OF REVIEWS BASED ON ONLINE REVIEWER GENERATED CONTENT

FIELD

The present disclosure relates generally to analyzing reviews, and more particularly to a system and method for generating a quality score for reviews based on social media content and other review generated content.

BACKGROUND

Many online content providers allow users to review products and/or services. These reviews are typically published to assist others in evaluating the products or services and in making purchase decisions. A user researching a product or service will often use Internet search engines to search for reviews and to sift through the myriad of results that are returned by the search engine. While some of the reviews may contain valuable information that can assist a user in making a decision, certain reviews can be misleading. For instance, certain reviewers are paid to provide product or service reviews on various sites. These reviewers can post reviews that tout the advantages of products or services with which the reviewer has had no interaction. In some cases, these reviews can be directly contrary to the reviewer's true feelings towards the product or service.

Many people share comments about products and services in their social media platform and other platforms, such as through emails, blogs, documents, etc. For instance, users may praise or criticize a product in comments provided to members of their social network. These comments typically can be representative of a reviewer's true sentiment about a product or service. In this connection, social media and other platforms, with user consent, have analyzed social media content to assess information about products or services.

SUMMARY

Aspects and advantages of the invention will be set forth in part in the following description, or may be obvious from the description, or may be learned through practice of the invention.

One exemplary aspect of the present disclosure is directed to a computer-implemented method of assessing the quality of a review provided by a reviewer in an online review platform. The method includes accessing, with the consent of the reviewer, reviewer generated content associated with the reviewer. The reviewer generated content includes information about a product or service posted outside of the review platform. The method further includes analyzing the reviewer generated content to extract product review data and matching the product review data with the review provided by the reviewer in the online review platform. The method further includes determining a quality score for the review based on the product review data extracted from the reviewer generated content. The quality score can provide a measure of the consensus between the product review data extracted from the reviewer generated content and the review.

Other exemplary aspects of the present disclosure are directed to systems, apparatus, non-transitory computer-readable media, user interfaces and devices for assessing the quality of reviews shared by a reviewer in an online review platform.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for assessing the quality of a review in an online review platform. The review platform can be any system, site, or service that allows users to post or submit reviews about products or services. Review platforms are interested in receiving and publishing quality reviews. They can do so, by determining a quality score for the reviews they publish. The quality score for a review can be determined based on the reviewer's additional commentary regarding a product or service that is the subject of a review in a social media setting (e.g. the Google+ social network platform provided by Google Inc) or in other settings, such as in email, blogs, documents, calendar data, and other data generated by the reviewer outside of the review platform.

More particularly, a reviewer can optionally allow the review platform access to the user's social media platform. With the reviewer's express informed consent, the reviewer's social media content can be analyzed to identify comments, statements, discussions, or other content related to products and services the reviewer published or sought to publish on the review platform. For instance, a sentiment analysis technique can be used to identify a sentiment expression in the reviewer's social media content. The social media content surrounding the sentiment expression can be analyzed to identify a product or service, such as the product or service that is the subject of a review posted by the reviewer. Product review data that includes the sentiment expression and the identity of the product or service can then be extracted and matched to a particular review submitted by the reviewer for publication on the review platform. A quality score for the review can then be generated based on the consensus between the product review data extracted from the social media content and the review posted by the reviewer to the review platform.

For example, in one particular implementation, a review published or sought to be published on the review platform can be assigned a review sentiment classification that indicates whether the review is a positive review or a negative review. For instance, sentiment analysis techniques can be performed on the review to determine whether the review is a positive review or a negative review. Likewise, a sentiment expression extracted from the reviewer's social media can be assigned a sentiment expression classification that indicates whether the sentiment expression is a positive sentiment expression or a negative sentiment expression. The quality score associated with the review can be relatively high if the review has a review sentiment classification that is consistent with the sentiment expression classification (e.g. both are positive or both are negative). The quality score can be relatively low if the review has a review sentiment classification that is not consistent with the sentiment expression classification (e.g. one is positive and the other is negative).

In other implementations, a sentiment score can be generated for both the review and the product review data extracted from the social media platform. The sentiment score can be used to represent both the type of sentiment (e.g. positive or negative) and the magnitude of the sentiment. The quality score can be determined for the review based on the sentiment scores for the review and the product review data. For instance, the quality score can be determined based on a difference between the sentiment scores such that the quality score is higher for reviews with sentiment scores that closely match the sentiment score of the product review data extracted from the social media content.

Using the techniques of the present disclosure, a reviewer can be afforded an opportunity to allow a review platform to enhance the visibility and reliability of reviews submitted to the review platform. A quality score determined based on consensus between the review and social media content can provide a reliable indicator of a reviewer's true sentiment regarding a product or service. Reviews posted in an online platform can be prioritized based on the quality score such that reviews consistent with social media content are more prominent. For instance, a search engine can rank reviews based at least in part on the quality score such that reviews that are consistent with social media content are ranked higher in a list of search results responsive to a search query. In addition, indicia indicative of the quality score can be displayed in conjunction with the reviews such that reviews that are consistent with a reviewer's social media content are more readily discernible.

Further, the quality score can be used to determine a rating for the reviewer. The rating can be based on the quality of all reviews submitted by the reviewer to the review platform. The rating can be displayed in conjunction with the review so that users of the review can further assess review quality based on the trustworthiness of the reviewer. Reviews can also be prioritized based on reviewer rating so that reviewers with higher ratings can have their reviews displayed more prominently in the review platform.

The present disclosure will be discussed with reference to generating a quality score for a review based on product review data from a social media platform shared by a reviewer. However, those of ordinary skill in the art, using the disclosures provided herein, will understand that the quality score can be generated based on product review data extracted from reviewer generated content associated with different sources, such as email archives, calendar data, documents, blogs, and other reviewer generated content.

For instance, sentiment analysis techniques can be performed on other reviewer generated content expressed by the reviewer online. In particular, with the reviewer's express informed consent, sentiment analysis techniques can be performed on the reviewer's email archives, chat archives, calendar data, documents, blogs, and other content generated by the reviewer to extract product review data. A quality score can then be generated for a review shared by the reviewer with an online review platform based on the extracted product review data.

In situations in which the systems and methods discussed herein access and analyze personal information about users, or make use of personal information, such as social media content, email data, calendar data, documents, blogs or other information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 1:
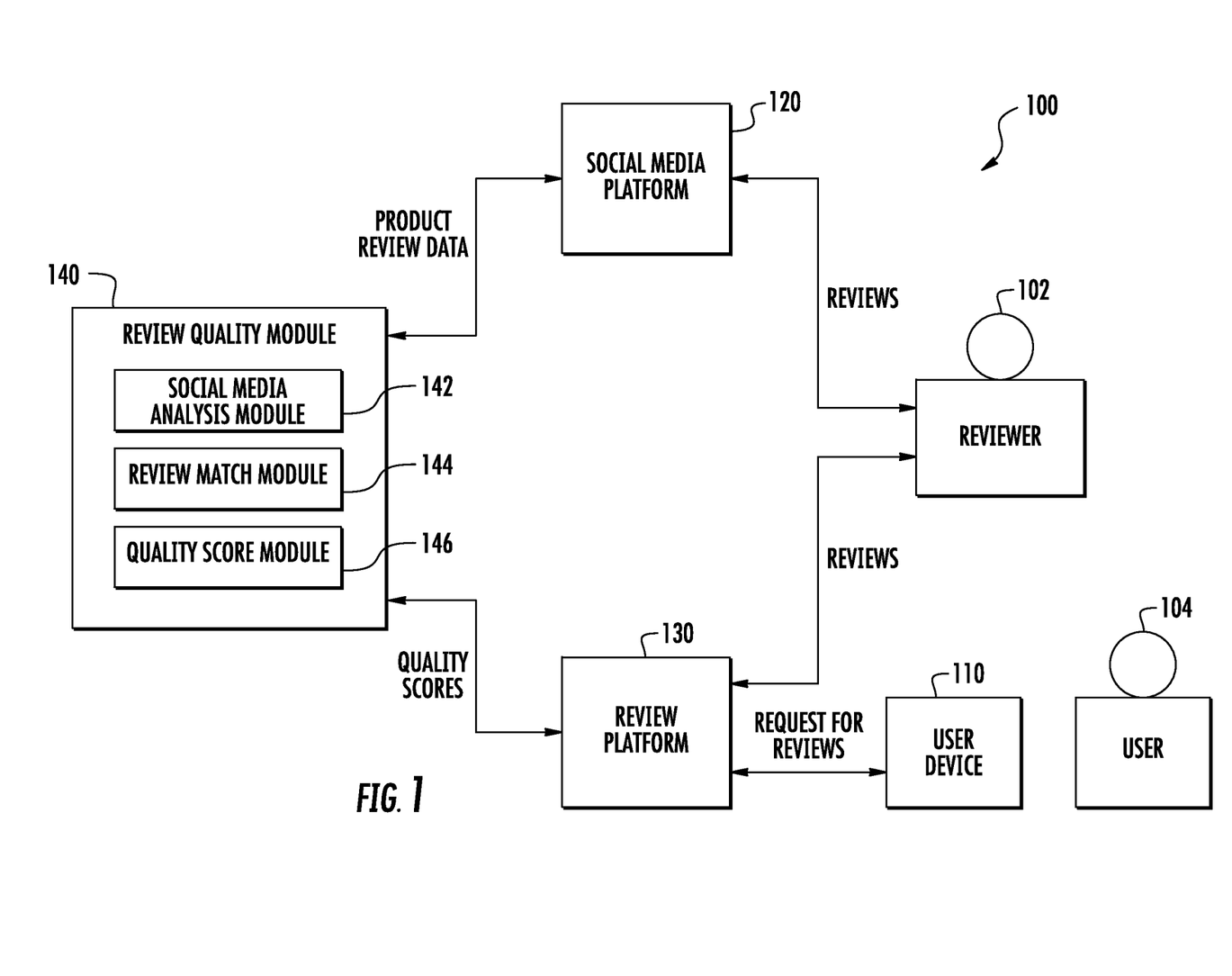
FIG. 1 depicts an overview of an exemplary system according to an exemplary embodiment of the present disclosure.

With reference now to the FIGS., exemplary embodiments of the present disclosure will now be set forth. FIG. 1 depicts an overview of an exemplary system 100 according to an exemplary embodiment of the present disclosure. The system 100 can include a review platform 130. The review platform 130 can be a website, service, search engine, or other platform that provides access to reviews of various products and services. The review platform 130 can be hosted by any suitable computing device, such as a web server.

The review platform 130 can allow a reviewer 102 to submit reviews regarding various products or services. For instance, the reviews can pertain to restaurants, hotels, dining, software, sports venues, sporting events, movies, consumer goods, music, entertainment venues, or other products and/or services. The reviews can take many suitable forms. In particular aspects, the reviews can contain textual data that discusses the product or service. The textual data can express sentiment about the product or service. Exemplary textual data associated with a review can include "The best monitor I have used;" "excellent pizza;" "truly awful service;" "grinning ear-to-ear," "two thumbs up," "5 stars," "10 out of 10," etc.

The review platform 130 can be in communication with a user device 110, for instance, over a network (e.g. the Internet). Although one user device 110 is illustrated in FIG. 1, many user devices can be in communication with the review platform 130. The user device 110 can be any suitable computing device, such as a laptop, desktop, smartphone, tablet, mobile device, or other computing device. The user device 110 can present a suitable user interface (e.g. a browser) to a user 104 that allows the user 104 to interact with the review platform 130. For example, the user 104 can submit a request for reviews of a particular product or service. The request can be in the form of a search query provided to a search engine or search tool. Responsive to the request, the review platform 130 can provide access to one or more reviews.

According to particular aspects of the present disclosure, a reviewer 102 can be provided the option to allow the review platform to enhance the reviews posted to the review platform 130 based on content shared by the reviewer 102 with a social media platform 120 or other platform. The reviewer 102 may have submitted data to the social media platform 120 that expresses sentiment about a particular product or service. For instance, the reviewer 102 may have submitted comments, statements, discussions or other content related to products and services to the social media platform 120. The reviewer 102 can give permission to the review platform to access this social media content to determine a quality score for reviews submitted to the review platform 130. The quality score can provide a measure of the consensus between the social media content shared by the reviewer 102 with the social media platform 120 and one or more reviews posted by the reviewer 102 to the review platform 130.

More particularly, the system 100 can include a review quality module 140 that can be implemented to determine a quality score for one or more reviews submitted to the review platform 130. The review quality module 140 can be implemented by any suitable computing device, such as the web server used to host the review platform 130. The review quality module 140 can be configured to access the social media content and to determine the quality score for a review based on agreement or consensus between the social media content and the review.

The review quality module 140 can include a social media analysis module 142, a review match module 144, a quality score module 146, and other suitable modules. The social media analysis module 142 can be configured to access social media content shared by the reviewer 102 with the social media platform 120. The social media analysis module 142 can be further configured to analyze the social media content to extract product review data shared with the social media platform by the reviewer 102. The product review data can include a sentiment expression about a product or service. The social media analysis module 142 can extract the product review data by performing sentiment analysis techniques on the social media content to identify sentiment expressions about a particular product or service. Exemplary sentiment analysis techniques will be discussed in more detail below.

The review match module 144 can be configured to match product review data extracted by the social media analysis module 142 with a review submitted to the review platform 130. For instance, the review match module 144 can match reviews and product review data by identifying reviews and product review data that are submitted by the same reviewer 102 and discuss the same or similar products and/or services.

The quality score module 146 can be configured to determine a quality score for the review. The quality score provides a measure of the consensus between the review and the product review data extracted from the social media content. The more the review and the product review data are in agreement, the higher the quality score determined for the review. As will be discussed in detail below, the quality score module 146 can determine the quality score using a variety of techniques, such as sentiment classification techniques and sentiment scoring techniques.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

The quality score for a review can be used for many purposes, such as prioritizing reviews in the review platform 130. Indicia indicative of the quality score can also be displayed in conjunction with the review such that enriched reviews are more readily discernible by users of the review platform 130. In addition, the quality score can be used to determine ratings for different reviewers based on the quality scores of reviews submitted by the reviewers to the review platform 130.

Figure 2:
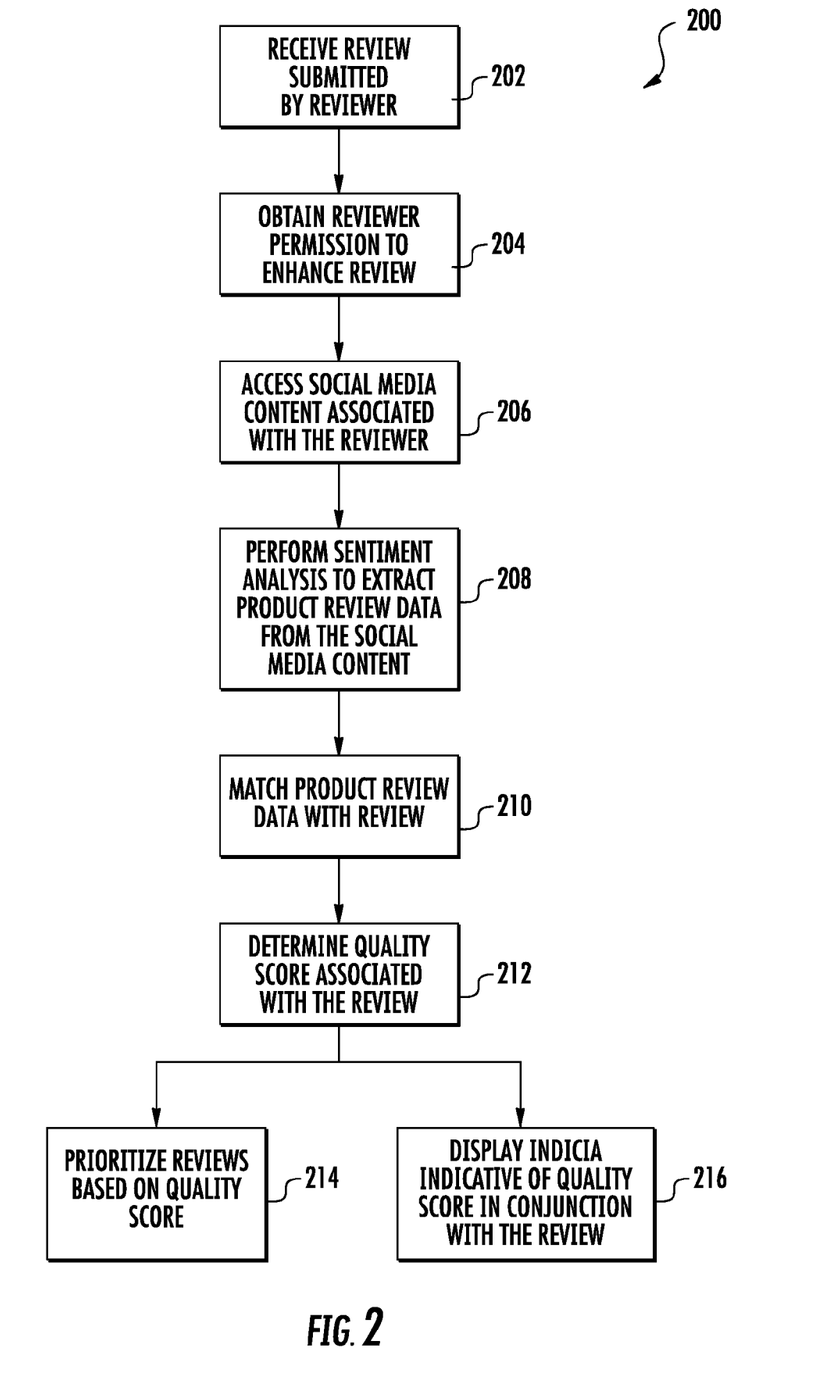
FIG. 2 depicts a flow diagram of an exemplary method according to an exemplary embodiment of the present disclosure.

FIG. 2 depicts a flow diagram of an exemplary computer-implemented method (200) for assessing the quality of a review according to an exemplary embodiment of the present disclosure. The method (200) of FIG. 2 can be implemented by any suitable computing device or system, such as the systems depicted in FIGS. 1 and 8. In addition, FIG. 2 depicts steps performed in a particular order for purposes of illustration and discussion. Those of ordinary skill in the art, using the disclosures provided herein, will understand that the various steps of any of the methods discussed herein can be omitted, rearranged, or adapted in various ways.

At (202), the method includes receiving a review submitted by a reviewer. For instance, the review can be received at the review platform 130 of FIG. 1. As discussed above, the review can pertain to any products and/or services. The review can include data submitted by the reviewer, including textual or other data providing a sentiment expression concerning the products and/or services.

At (204) of FIG. 2, the method can include obtaining user consent to enhance the review. For instance, the review platform 130 of FIG. 1 can provide the reviewer 102 the option of enhancing the review by sharing social media content. The option can be presented to the reviewer using a suitable user interface. For instance, a message can be presented to the reviewer asking whether the reviewer wants to provide access to social media content to enrich the posted review. The message can inform the reviewer of what data is going to be accessed, how the data is going to be used and/or maintained, and can inform the user that enriching the review provides advantages, but that the user is not required to grant access to social media content in order to submit the review to the review platform 130.

The reviewer can provide consent by providing a suitable interaction indicative of consent with the review platform 130. The reviewer can also adjust settings associated with the reviewer such that one or more reviews submitted by the reviewer are automatically enhanced using social media content shared with a social media platform. In particular embodiments, a suitable incentive can be offered to the reviewer to incentivize the reviewer to enrich the reviews. The incentive can include a monetary incentive, a discount, offer, coupon, preferred or enhanced status at the review platform, increased prominence for reviews submitted by the reviewer, or other suitable incentive.

After receiving permission from the reviewer, social media content associated with the reviewer can be accessed as shown at (206) of FIG. 2. For instance, the review quality module 140 implemented as part of or in conjunction with the review platform 130 can access social media content shared by the user with the social media platform 120. In one particular implementation, the review quality module 140 can fetch social media content associated with the reviewer via a suitable application programming interface (API).

At (208), sentiment analysis techniques are performed on the social media content to extract product review data. The sentiment analysis techniques can be implemented, for instance, by the social media analysis module 142 of FIG. 1. The sentiment analysis techniques are used to identify sentiment expressions in the social media content pertaining to a product or service that is the subject of a review. These sentiment expressions can be compared with sentiment expressions provided in the review to assess the quality of the review.

Figure 3:
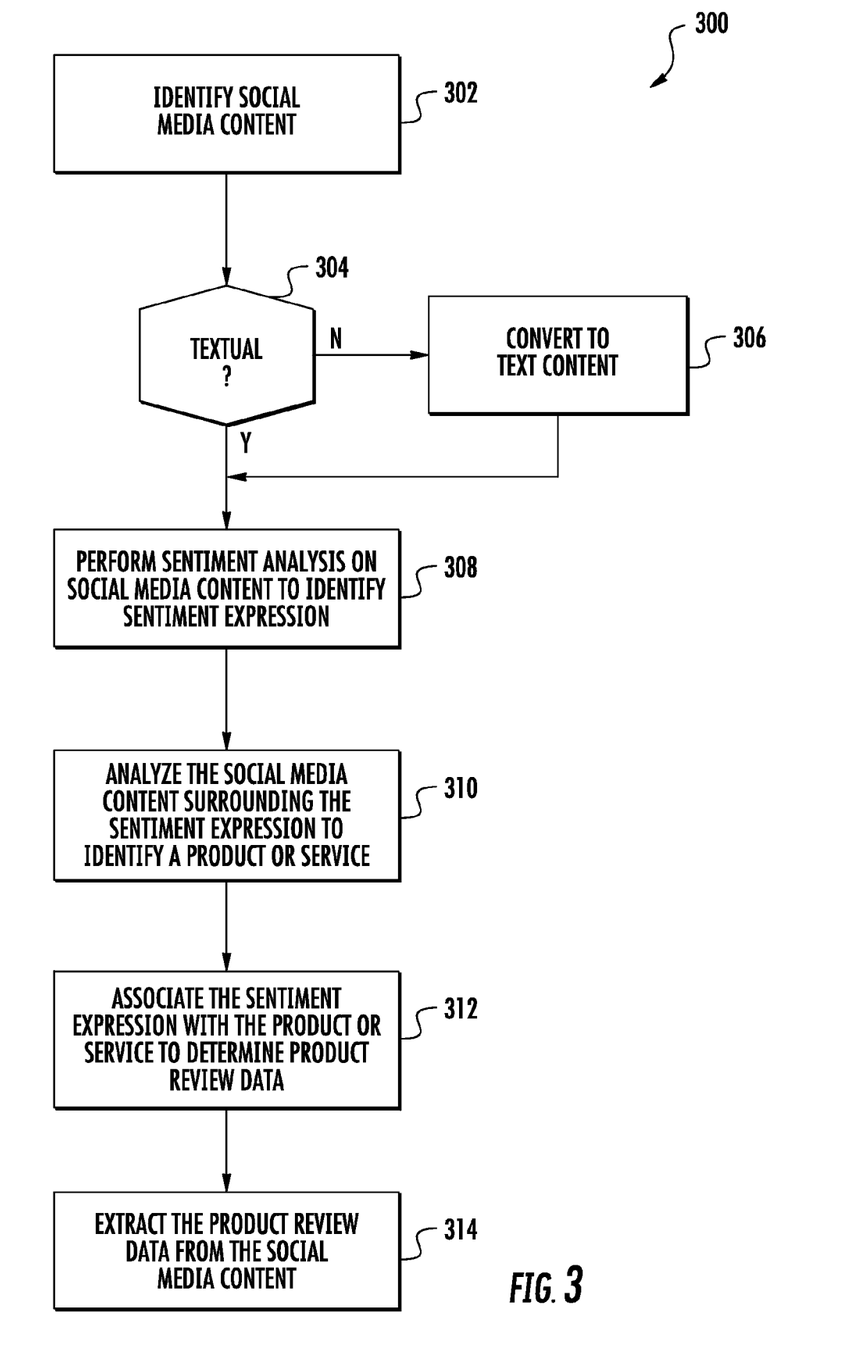
FIG. 3 depicts a flow diagram of an exemplary method for extracting product review data from social media content according to an exemplary embodiment of the present disclosure.

FIG. 3 depicts an exemplary method (300) for extracting product review data from social media content according to an exemplary embodiment of the present disclosure. At (302), social media content is identified. For instance, the social media content can be content fetched from the social media platform via a suitable API. The identified social media content can be limited in time or based on other factors. For instance, to preserve computing resources, the identified social media content can be limited to content that has been submitted by the reviewer within a specified time frame. In addition, only certain types of social media content (e.g. comments, videos, etc.) can be identified. The reviewer can be provided the option to specify which types of social media content can be identified for sentiment analysis.

At (304), it is determined whether the social media content is textual content. The sentiment analysis techniques disclosed herein are typically suitable for textual data. When the social media content includes only textual data, the method can proceed to (308) where sentiment analysis is performed on the textual data. When the social media content includes non-textual content, the method can include performing sentiment analysis techniques on the audio or visual content itself. For instance, algorithms can be used to detect sentiment expressions such as laughter in audio content or laughter and/or smiles in video content. Sentiment expressions associated with products and/or services can be extracted as product review data. Various suitable algorithms for detecting laughter, smiles, frowns, and other sentiment expressions are known. Any of these suitable algorithms can be used without deviating from the scope of the present disclosure.

In addition and/or in the alternative, the method can include converting the content to textual content (306). For instance, if the social media content includes audio content or video content, the content can be converted to textual data using suitable audio to text conversion techniques. Those of ordinary skill in the art, using the disclosures provided herein, will understand that a variety of different techniques are available for converting audio or video content to textual data. Any of the techniques can be used without deviating from the scope of the present disclosure. Once the social media content has been converted to textual content, the method can proceed to (308) for sentiment analysis.

At (308), sentiment analysis is performed on the social media content to identify a sentiment expression. A variety of sentiment analysis techniques can be used to identify a sentiment expression. For instance, various algorithms can be used to identify positive or negative sentiment words (e.g. "good," "bad," "awful," "great," "excellent," etc.) in the social media content. The sentiment expressions can be identified based on a database of predefined sentiment keywords. Searching techniques can be used to identify the keywords in the social media content. Grammatical rules and/or syntax rules can also be defined to identify when a sentiment associated with a word is being modified, such as determining when a positive sentiment word (e.g. "good") is preceded by the word "not."

In one particular implementation, the textual data of the social media content can be tokenized to produce a set of tokens. Each token can be subject to part-of-speech tagging to associate a part of speech with the token. The tokens can be subjected to natural language processing techniques such as stemming, word sense disambiguation and compound recognition. The set of tagged tokens can be analyzed to extract sentiment expressions. For instance, part of speech combinations (e.g. adjective, noun combinations; adverb, adjective, noun combinations; verb, adjective, noun combinations; pronoun, verb, adverb combinations; adjective, adverb, verb, noun combinations; or other combinations) can be extracted to identify a sentiment expression. Other methods of identifying sentiment expressions can be used, such as syntax trees or semantic grammars.

Once the sentiment expression has been identified, the textual content surrounding the sentiment expression can be analyzed to identify a product or service (310). For instance, textual data within a predefined number of characters can be identified and analyzed to identify the presence of keywords associated with product or services. The keywords can be a set of predefined keywords associated with various products or services specified in a database. In one particular implementation, the predefined set of keywords can correspond to the products and/or services that are the subject of reviews submitted by the reviewer to the review platform.

At (312), the sentiment expression is associated with the identified product or service to determine product review data. The product review data can then be extracted for use in generating a quality score according to exemplary aspects of the present disclosure (314).

Referring back to FIG. 2 at (210), the extracted product review data is matched with a review submitted by the reviewer. For instance, the review match module 144 of FIG. 1 can match the product review data with a review submitted by the reviewer 102 to the review platform 130. The product review data and the review can be matched based on identity of the reviewer and the identity of the product or service extracted as part of the product review data. In one implementation, reviews submitted by the reviewer associated with the product or service included in the product review data can be identified. In addition or in the alternative, the product review data can be analyzed to determine whether it includes a product or service that is the subject of a review submitted by the reviewer. Other suitable techniques can be used for matching the product review data without deviating from the scope of the present disclosure.

At (212), a quality score is generated for the review based on the matched product review data. The quality score is indicative of the consensus between the review and the matched product review data. Higher quality scores can be indicative of consistency between the product review data and the review. Lower quality scores are indicative of inconsistency between the product review data and the review.

Figure 4:
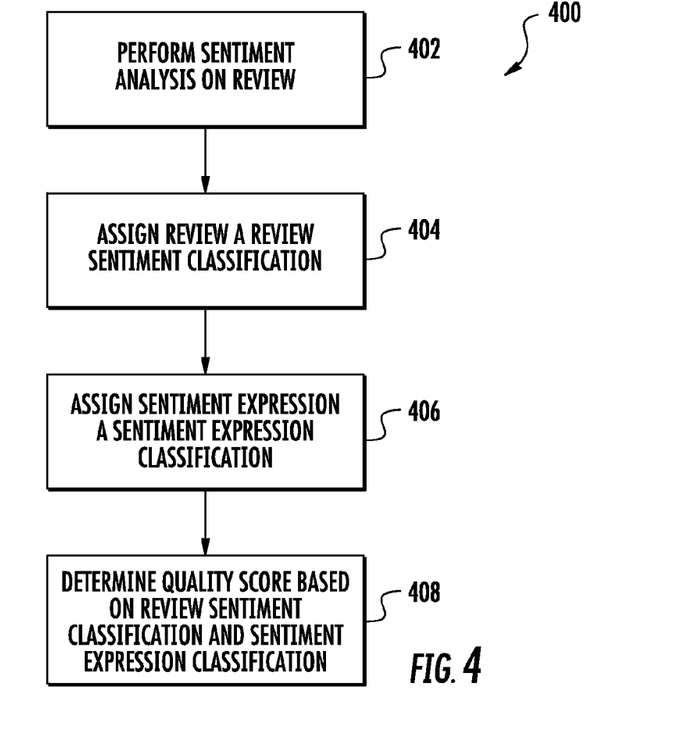
FIG. 4 depicts a flow diagram of an exemplary method for determining a quality score for a review according to an exemplary embodiment of the present disclosure.

FIG. 4 depicts one exemplary method (400) for determining a quality score according to an exemplary embodiment of the present disclosure. The method (400) can be suitable for determining relatively simple quality scores, such as a first value for reviews that are consistent with product review data received from a social media platform and a second value for reviews that are not consistent with such product review data.

At (402), sentiment analysis can be performed on the review posted to the review platform to identify sentiment expressions in the review. Similar sentiment analysis techniques to the techniques discussed with reference to FIG. 3 can be used to identify sentiment expressions in the review. The review can be assigned a review sentiment classification based on the identified sentiment expression (404). The review sentiment classification can be indicative of whether the review is a positive review or a negative review. For instance, sentiment phrases can be classified as positive or negative based on, for instance, a database of rules associating sentiment words with either a positive sentiment or a negative sentiment. If the sentiment expression of the review contains positive sentiment phrases (or more positive sentiment phrases than negative sentiment phrases), the review can be classified as a positive review. If the sentiment expression of the review contains negative sentiment phrases (or more negative sentiment phrases than positive sentiment phrases), the review can be classified as a negative review.

At (406), the sentiment expression found in the product review data that was extracted from the social media content can be assigned a sentiment expression classification. The sentiment expression classification can be indicative of whether the sentiment expression found in the product review data is a positive sentiment expression or a negative sentiment expression. For instance, if the sentiment expression found in the product review data contains positive sentiment phrases (or more positive sentiment phrases than negative sentiment phrases), the sentiment expression can be classified as a positive sentiment expression. If the sentiment expression found in the product review data contains negative sentiment phrases (or more negative sentiment phrases than positive sentiment phrases), the sentiment expression can be classified as a negative sentiment expression.

At (408), the quality score is determined for the review based on the product review data sentiment expression classification and the sentiment review classification. For instance, if the product review data sentiment classification and the sentiment review classification are consistent (e.g. both are positive or both are negative), a quality score indicative of high reliability can be determined. If the product review data sentiment classification and the sentiment review classification are inconsistent, a quality score indicative of low reliability can be generated.

Figure 5:
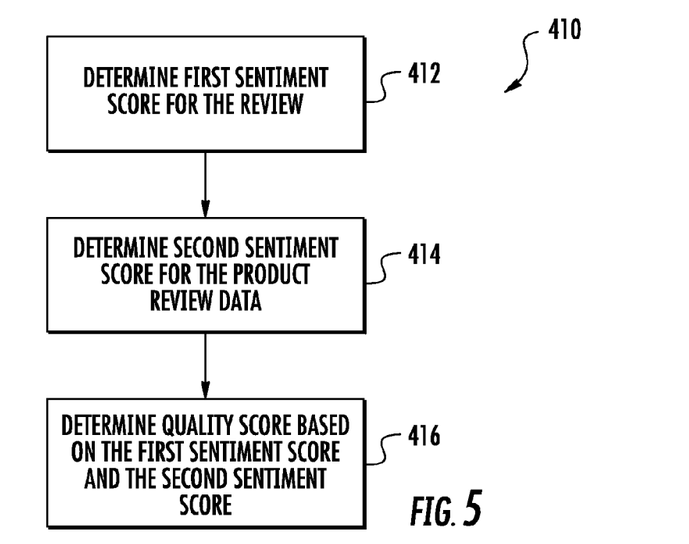
FIG. 5 depicts a flow diagram of an exemplary method for determining a quality score for a review according to an exemplary embodiment of the present disclosure.

FIG. 5 depicts another exemplary method (410) for determining a quality score according to an exemplary embodiment of the present disclosure. The method (410) can be suitable for determining a quality score based not only on the classification of the sentiments expressed in the product review data and the review, but also on the magnitude of the expressed sentiments.

At (412), a first sentiment score is determined for the review published or sought to be published on the review platform. The first sentiment score can be indicative of the type of sentiment expressed in the review (e.g. positive or negative) and the magnitude of the sentiment expressed in the review. For example, the sentiment scores can range from −5 to 5. A sentiment score of −5 can be indicative of very strong negative sentiment (e.g. hate). A sentiment score of −1 can be indicative of slightly negative sentiment (e.g. "less than average"). A sentiment score of 5 (e.g. "love") can be indicative of a strong positive sentiment while a sentiment score of 1 can be indicative of slightly positive sentiment (e.g. "better than average"). A sentiment score of 0 can be indicative of a neutral sentiment.

The sentiment score can be determined for the review by performing sentiment analysis for the review to identify sentiment phrases. Scores can be assigned to each of the sentiment phrases indicating the magnitude and type of sentiment expressed. The scores can be determined for the sentiment phrases in any suitable fashion, such as through a look up table correlating scores with particular predefined sentiment phrases. The first sentiment score can be determined for the review based on the scores for all of the sentiment phrases expressed in the review. For instance, the scores for all the sentiment phrases can be averaged or summed to determine the first sentiment score.

At (414), a second sentiment score is determined for the product review data extracted from the social media platform. The second sentiment score can be indicative of the type of sentiment expressed in the product review data and the magnitude of the sentiment expressed in the product review data. The second sentiment score can be determined based on the sentiment expression(s) identified in the product review data. If multiple sentiment expression(s) are identified in the product review data, the second sentiment score can be based on scores associated with each sentiment expression, such as an average or sum of the scores associated with the sentiment expressions. The scores can be determined for the identified sentiment expressions in any suitable fashion, such as through a look up table correlating scores with particular predefined sentiment phrases.

Once the first and second sentiment scores have been determined, the quality score can be determined based on the first and second sentiment scores (416). Any suitable algorithm can be used to determine the quality score based on the first and second sentiment scores. In one implementation, the algorithm can determine the quality score based on the difference between the first and second sentiment scores. The algorithm can provide a relatively low quality score for larger differences between the first and second sentiment scores and a relatively high quality score for smaller differences between the first and second sentiment scores.

Once determined, the quality score can be used for a variety of purposes. For instance, as shown at (212) of FIG. 2, the quality score can be used to prioritize reviews in the review platform. Reviews associated with higher quality scores can be assigned a higher priority than reviews associated with lower quality scores or no quality scores at all. Reviews with higher priority can be more prominently displayed to a user. For instance, the reviews can be ordered based on the quality scores. In the example of a search engine returning search results that include reviews, the search engine can rank the reviews based at least in part on the quality scores such that reviews with high quality scores are listed higher in the search results.

Figure 6:
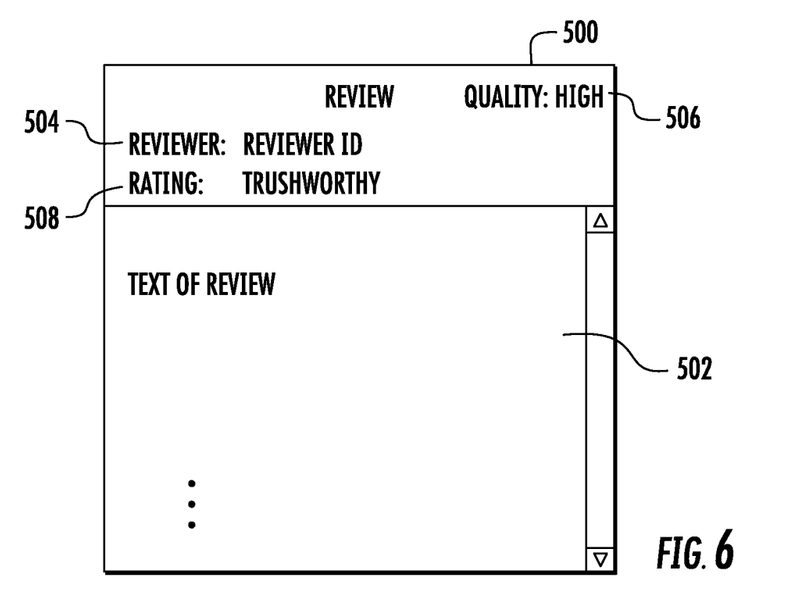
FIGS. 6 and 7 depict exemplary reviews having indicia indicative of review quality according to an exemplary embodiment of the present disclosure.

At (214) of FIG. 2, indicia indicative of the quality score can be displayed in conjunction with reviews so that users can more readily identify reliable reviews. The indicia can be any suitable indicator of quality. FIG. 6 depicts an exemplary review 500 that has been enhanced according to an exemplary embodiment of the present disclosure. The review 500 includes textual data 502 that expresses sentiment about a product or service and an identifier 504 of the reviewer that submitted the review 500. The review 500 also includes indicia 506 indicative of the quality of the review based on the quality score determined for the review. The indicia "high" can indicate that the review 500 is associated with a high quality score and is therefore more reliable than other reviews. Other suitable indicia can be indicative of different quality scores. For instance, the indicia "low" can indicate that the review is of low quality and is not reliable.

Figure 7:
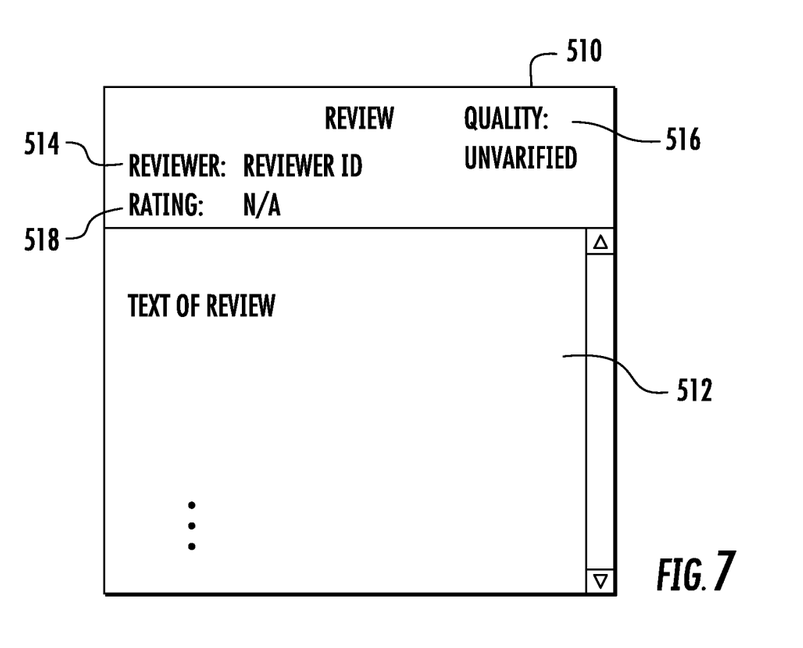

FIG. 7 depicts an exemplary review 510 that has not been enhanced according to aspects of the present disclosure. Similar to the review 500, the review 510 includes textual data 502 that expresses sentiment about a product or service and an identifier 514 of the reviewer that submitted the review 510. The review 510 also includes indicia 516. The indicia can include the text "unverified" or other suitable indicia that indicates that a quality score has not been generated for the review.

In further embodiments of the present disclosure, the quality score generated for the review can be used to determine a rating for the reviewer submitting the review. The rating can be determined based on the quality scores for all reviews submitted by the reviewer. Each time a reviewer submits a review to the review platform, the rating for the reviewer can be updated or modified based on the quality score determined for the review. A higher rating for a reviewer can indicate that the reviewer typically posts reliable reviews to the review platforms. Reviews provided by reviewers with a higher rating can also be more prominently presented or displayed in the review platform than reviews submitted by reviewers with a lower rating or no rating all.

Indicia associated with the ratings of reviewers can also be displayed in conjunction with the reviews. For instance, as shown in FIG. 6, a rating 508 is displayed in conjunction with the review 500. The rating "trustworthy" can indicate to a user that the reviewer typically provides reliable reviews to the review platform. As shown in FIG. 7, ratings for reviews that have not been enhanced according to aspects of the present disclosure can display information 518 indicating that a rating is not available for the user.

Figure 8:
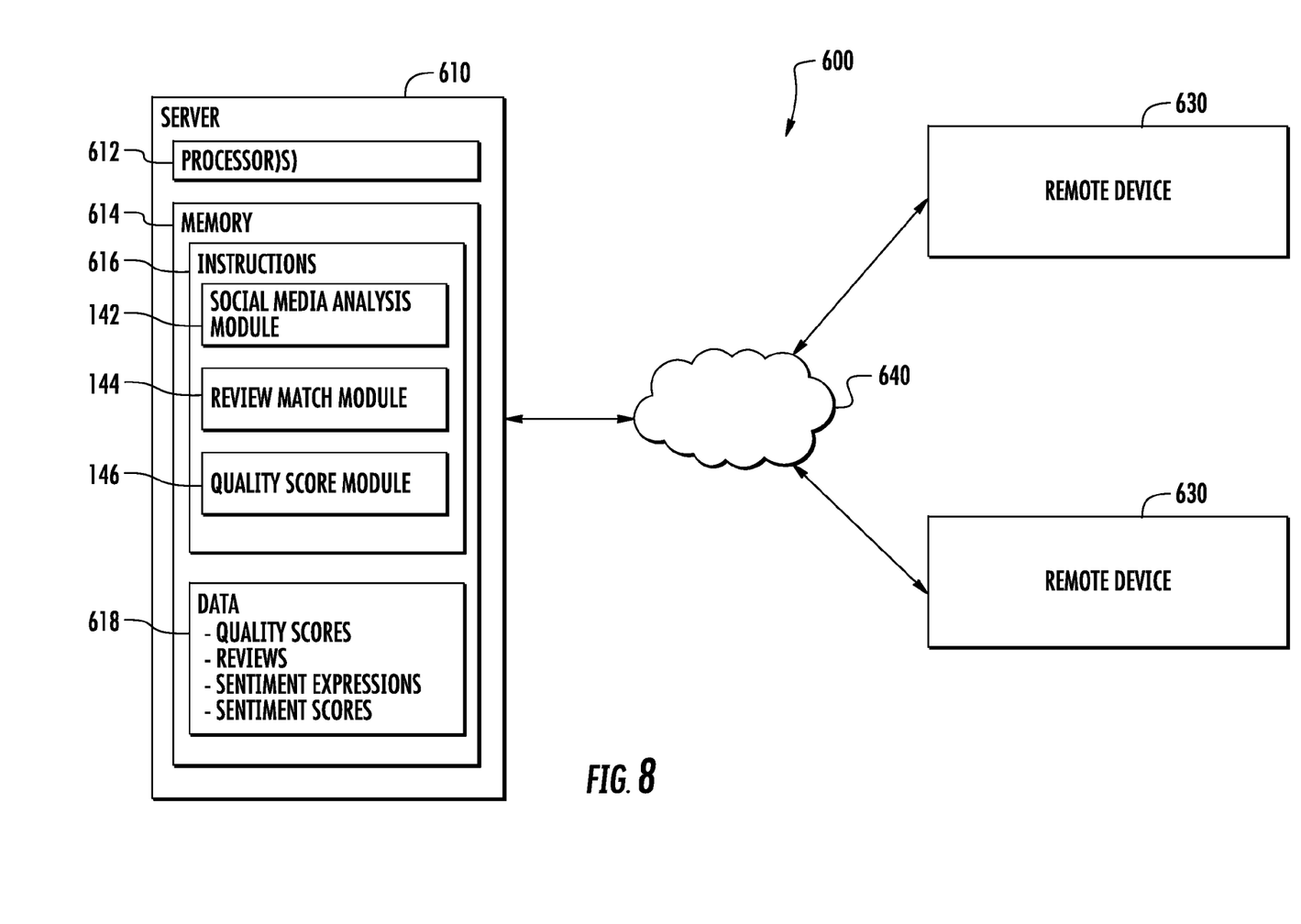
FIG. 8 depicts an exemplary computer-based system according to an exemplary embodiment of the present disclosure.

FIG. 8 depicts an exemplary computing system 600 that can be used to implement the methods and systems of assessing the quality of a review according to aspects of the present disclosure. The system 600 is a client-server architecture that includes a server 610 that communicates with one or more client devices 630 over a network 640. The system 600 can be implemented using other suitable architectures, such as a single computing device.

The system 600 includes a server 610, such as a web server. The server 610 can be used to host a review platform. The server can be implemented using any suitable computing device(s). The server 610 can have a processor(s) 612 and a memory 614. The server 610 can also include a network interface used to communicate with one or more remote computing devices (i.e. client devices) 630 over a network 640. The network interface can include any suitable components for interfacing with one more networks, including for example, transmitters, receivers, ports, controllers, antennas, or other suitable components.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement the social media analysis module 142, the review match module 144, and the quality score module 146 discussed with reference to FIG. 1.

Memory 614 can also include data 618, such as quality scores, reviews, sentiment expressions, sentiment scores, etc. that can be retrieved, manipulated, created, or stored by processor(s) 612. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two clients 630 are illustrated in FIG. 8, any number of client devices 630 can be connected to the server 610 over the network 640. The client devices 630 can be any suitable type of computing device, such as a general purpose computer, special purpose computer, laptop, desktop, integrated circuit, mobile device, smartphone, tablet, or other suitable computing device.

Similar the computing device 610, a client device 630 can include a processor(s) and a memory. The memory can store information accessible by processor(s), including instructions that can be executed by processor(s) and data. The client device 630 can include various input/output devices for providing and receiving information from a user, such as a touch screen, touch pad, data entry keys, speakers, and/or a microphone suitable for voice recognition. For instance, the computing device 630 can have a display for presenting information, such as reviews, to a user.

The network 640 can be any type of communications network, such as a local area network (e.g. intranet), wide area network (e.g. Internet), or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of assessing the quality of a review, the method comprising:
    accessing, by one or more computing devices, a review provided by a reviewer in an online review platform;
    accessing, by the one or more computing devices, reviewer generated content provided by the reviewer, the reviewer generated content comprising social media content about a product or service posted in a social media platform outside of the review platform;
    analyzing, by the one or more computing devices, the reviewer generated content posted in the social media platform to extract product review data;

matching, by the one or more computing devices, the product review data with the review provided by the reviewer in the online review platform; and determining, by the one or more computing devices, a quality score for the review based on the product review data extracted from the reviewer generated content, the quality score providing a measure of a degree of consistency between a sentiment associated with the product review data extracted from the reviewer generated content and a sentiment associated with the review.

2. The computer-implemented method of claim 1, wherein the method comprises prioritizing a plurality of reviews based at least in part on the quality score determined for the review.

3. The computer-implemented method of claim 1, wherein the method comprises providing indicia in conjunction with the review based on the quality score for the review.

4. The computer-implemented method of claim 1, wherein the product review data is related to a product or to a service.

5. The computer-implemented method of claim 1, wherein analyzing the reviewer generated content to extract product review data comprises:
performing a sentiment analysis on the reviewer generated content to identify a sentiment expression;
analyzing the reviewer generated content surrounding the sentiment expression to identify a product or service; and
extracting the product review data from the reviewer generated content, the product review data comprising the sentiment expression and an identity of the product or service.

6. The computer-implemented method of claim 1, wherein the reviewer generated content comprises textual content, audio content, or video content.

7. The computer-implemented method of claim 5, wherein the product review data and the review are matched based on identity of the reviewer and the identity of the product or service extracted as part of the product review data and the product or service that is the subject of the review.

8. The computer-implemented method of claim 5, wherein determining a quality score for the review based on the product review data comprises:
determining a review sentiment classification for the review, the review sentiment classification indicative of whether the review is a positive review or a negative review;
determining a sentiment expression classification of the sentiment expression in the product review data, the sentiment expression classification indicative of whether the sentiment expression in the product review data is a positive sentiment expression or a negative sentiment expression; and
determining a quality score for the review based on the review sentiment classification and the sentiment expression classification.

9. The computer-implemented method of claim 5, wherein determining a quality score for the review based on the product review data comprises:
determining a first sentiment score for the review, the first sentiment score indicative of a type and a magnitude of a sentiment expressed in the review;
determining a second sentiment score for the product review data, the second sentiment score indicative of a type and a magnitude of a sentiment expression in the product review data; and
determining the quality score based at least in part on the first sentiment score and the second sentiment score.

10. The computer-implemented method of claim 9, wherein the quality score is determined based at least in part on a difference between the first sentiment score and the second sentiment score.

11. The computer-implemented method of claim 1, wherein the method comprises determining a rating for the reviewer based on the quality score, the rating being determined based at least in part on quality scores associated with a plurality of reviews submitted by the reviewer.

12. A computing system for assessing the quality of a review, the system comprising:
one or more memory devices storing instructions; and
one or more processors, configured to execute the instructions stored in the one or more memory devices in order to execute a method, the method comprising:
accessing a review of a product or service provided by a reviewer in an online review platform;
accessing reviewer generated content provided by the reviewer, the reviewer generated content comprising information about the product or service posted in a social media platform outside of the review platform;
analyzing the reviewer generated content posted in the social media platform to extract product review data;
matching the product review data with the review provided by the reviewer in the online review platform; and
determining a quality score for the review based on the product review data extracted from the reviewer generated content, the quality score providing a measure of a degree of consistency between a sentiment associated with the product review data extracted from the reviewer generated content and a sentiment associated with the review.

13. The computing system of claim 12, wherein analyzing the reviewer generated content to extract product review data comprises:
performing a sentiment analysis on the reviewer generated content to identify a sentiment expression;
analyzing the reviewer generated content surrounding the sentiment expression to identify a product or service; and
extracting the product review data from the reviewer generated content, the product review data comprising the sentiment expression and an identity of the product or service.

14. The computing system of claim 12, wherein the product review data and the review are matched based on identity of the reviewer and the identity of the product or service extracted as part of the product review data and the product or service that is the subject of the review.

15. The computing system of claim 13, wherein determining a quality score for the review based on the product review data comprises:
determining a first sentiment score for the review, the first sentiment score indicative of a type and a magnitude of a sentiment expressed in the review;
determining a second sentiment score for the product review data, the second sentiment score indicative of a type and a magnitude of a sentiment expression in the product review data; and
determining the quality score based at least in part on the first sentiment score and the second sentiment score.

16. One or more tangible, non-transitory computer-readable media storing computer-readable instructions that when executed by one or more processors cause the one or more processors to perform operations, the operations comprising:

accessing a review of a product or service provided by a reviewer in an online review platform;

accessing reviewer generated content provided by the reviewer, the reviewer generated content comprising information about the product or service posted in a social media platform outside of the review platform;

analyzing the reviewer generated content to extract product review data;

matching the product review data with the review provided by the reviewer in the online review platform; and determining a quality score for the review based on the product review data extracted from the reviewer generated content, the quality score providing a measure of a degree of consistency between a sentiment associated with the product review data extracted from the reviewer generated content and a sentiment associate with the review.

17. The one or more tangible, non-transitory computer-readable media of claim 16, wherein the operation of analyzing the social media content to extract product review data comprises:

performing a sentiment analysis on the reviewer generated content to identify a sentiment expression;

analyzing the reviewer generated content surrounding the sentiment expression to identify a product or service; and extracting the product review data from the reviewer generated content, the product review data comprising the sentiment expression and an identity of the product or service.

18. The one or more tangible, non-transitory computer-readable media of claim 16, wherein the operation of determining a quality score for the review based on the product review data extracted from the social media platform comprises:

determining a first sentiment score for the review, the first sentiment score indicative of a type and a magnitude of a sentiment expressed in the review;

determining a second sentiment score for the product review data, the second sentiment score indicative of a type and a magnitude of a sentiment expression in the product review data; and determining the quality score based at least in part on the first sentiment score and the second sentiment score.

* * * * *